United States Patent [19]
Sugiura

[11] Patent Number: 5,841,904
[45] Date of Patent: Nov. 24, 1998

[54] IMAGE PROCESSING METHOD AND APPARATUS

[75] Inventor: Susumu Sugiura, Atsugi, Japan

[73] Assignee: Canon Kabushiki Kaisha, Tokyo, Japan

[21] Appl. No.: 376,371

[22] Filed: Jan. 23, 1995

Related U.S. Application Data

[63] Continuation of Ser. No. 858,623, Mar. 27, 1992, abandoned.

[30] Foreign Application Priority Data

Mar. 29, 1991 [JP] Japan .................................. 3-066234

[51] Int. Cl.$^6$ ........................................................ G06K 9/36
[52] U.S. Cl. .............................................. 382/233; 382/251
[58] Field of Search ................................. 382/244, 245, 382/246, 248, 250, 251, 252, 240, 233, 253; 358/426, 261.2, 427

[56] References Cited

U.S. PATENT DOCUMENTS

| | | | |
|---|---|---|---|
| 4,677,479 | 6/1987 | Hatori et al. ............................. | 382/251 |
| 4,974,078 | 11/1990 | Tsai ........................................... | 358/133 |
| 5,005,206 | 4/1991 | Naillon et al. ............................ | 382/56 |
| 5,023,919 | 6/1991 | Wataya ..................................... | 382/233 |
| 5,333,212 | 7/1994 | Ligtenberg ............................... | 382/56 |
| 5,361,147 | 11/1994 | Katayama et al. ....................... | 358/532 |

*Primary Examiner*—Yon J. Couso
*Attorney, Agent, or Firm*—Fitzpatrick, Cella, Harper & Scinto

[57] ABSTRACT

In coding color still image data into multi-valued image data, the image quality deteriorates when a large compression ratio is used. In the present invention, a transmitted image is classified using a parameter transmitted from the transmitting station, and the deterioration of image quality caused by compression at the transmitting station is estimated from the image classification. In an image reproduction, a quantization table is used in the case of an adaptive discrete cosine transform (ADCT) method to select an optimum neural network suitable for image reproduction and improve the image quality.

23 Claims, 11 Drawing Sheets

F I G. 2
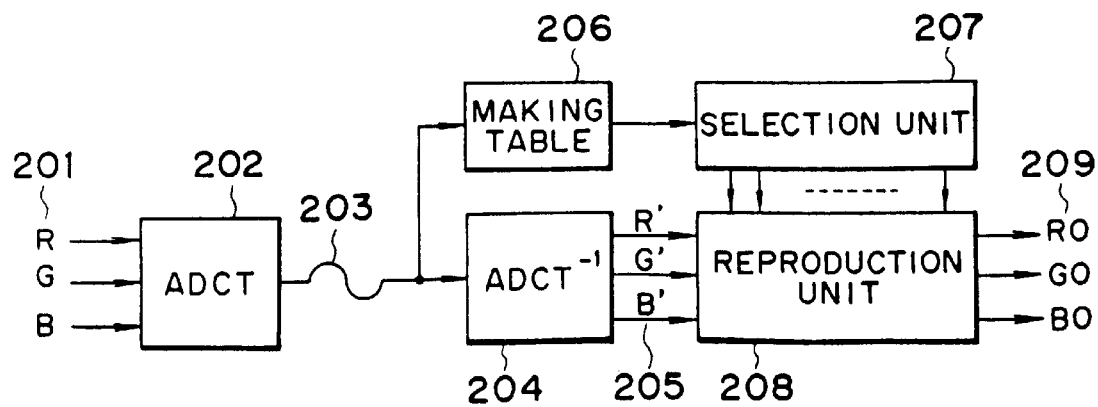

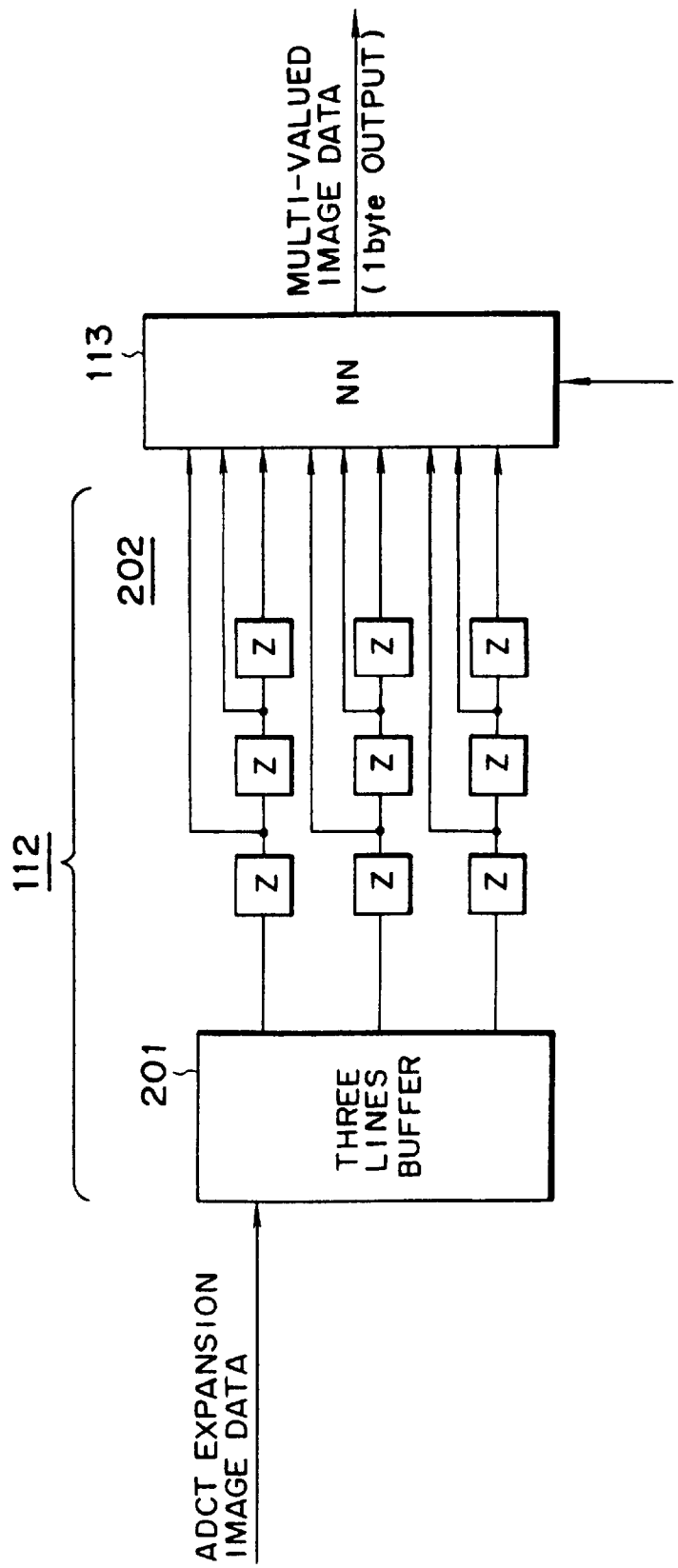

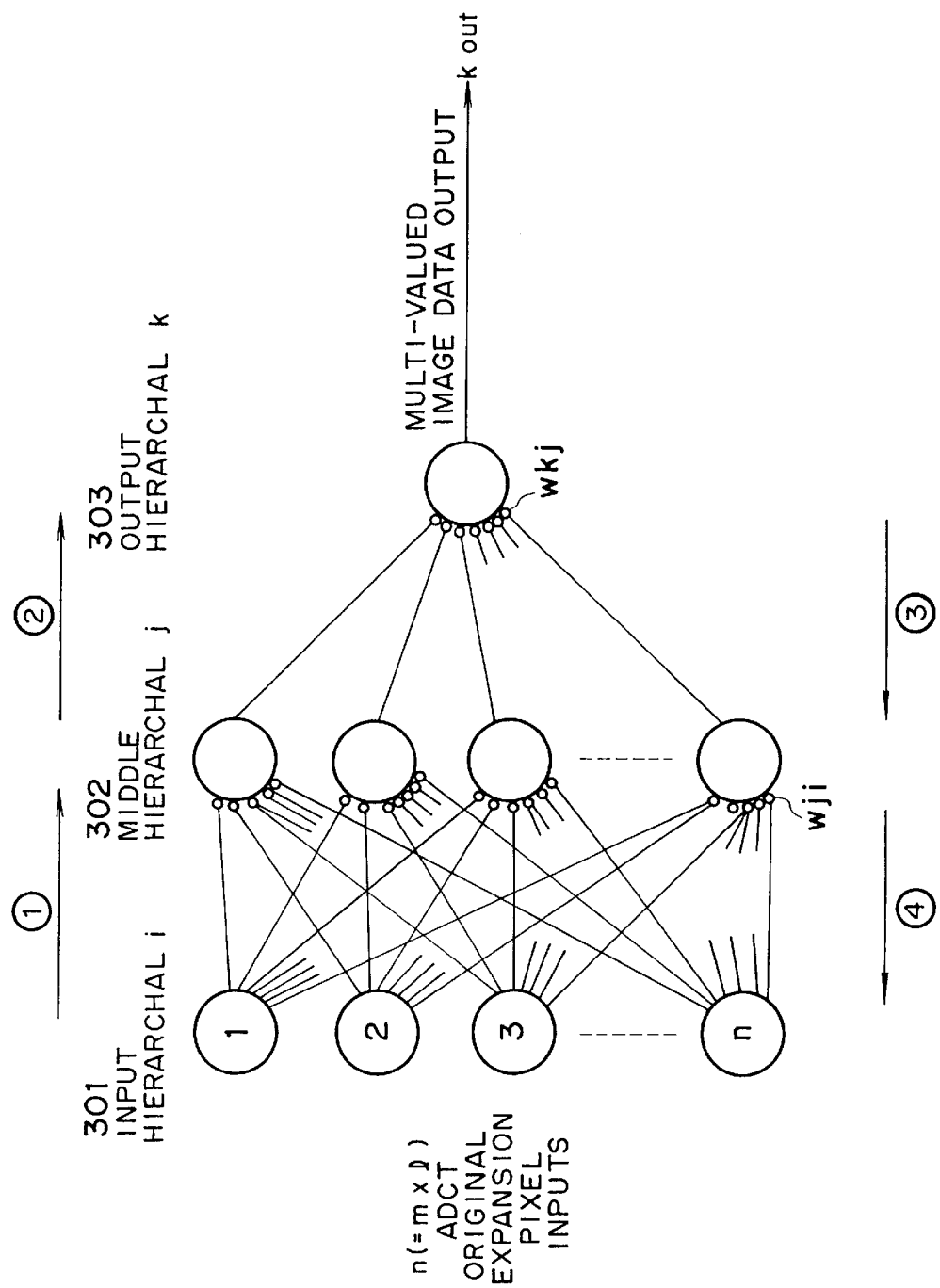

NINE INPUT
PIXELS

*:DENOTES
 ATTENTION
 PIXEL

IDEAL
OUTPUT

F I G. 10
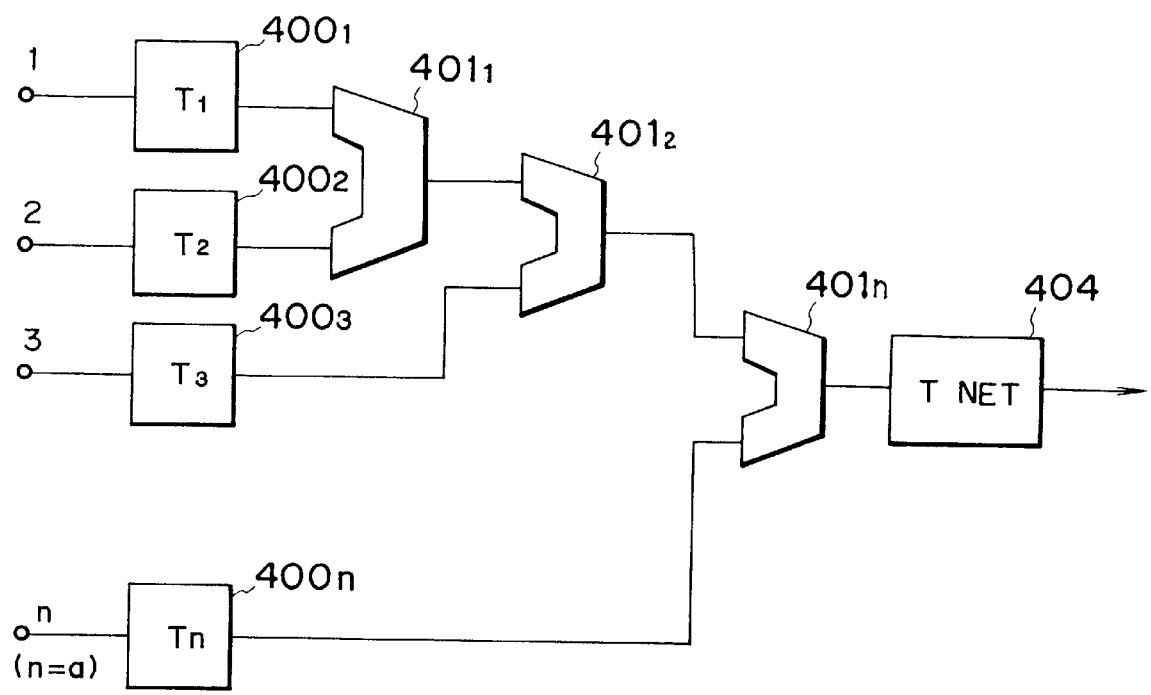

IMAGE PROCESSING METHOD AND APPARATUS

This application is a continuation of application Ser. No. 07/858,623, filed Mar. 27, 1992, now abandoned.

BACKGROUND OF THE INVENTION

1. Field of the Invention

The present invention relates to an image processing method, and more particularly to a method of expanding compressed image data.

2. Related Background Art

An adoptive discrete cosine transformation (ADCT) method of the Joint Photographic Expert Group (JPEG) has been proposed as a data compressing method. This method is a coding method used basically for multi-value still color image data on a CRT.

Therefore, if this method is used as a coding method for high precision color image data with characters and graphics like color facsimile, an image obtained from the resulting decoded data has a poor quality if a high compression ratio is used, particularly in the case of an image of characters and fine graphics lines.

Such a problem is associated not only with the ADCT method but also with various other methods. However, the ADCT method degrades to a large extent the quality of character and fine graphics images at a high compression ratio.

SUMMARY OF THE INVENTION

It is an object of the present invention to provide an image processing method and apparatus capable of solving the above problem.

It is another object of the present invention to provide an image processing method and apparatus capable of reliably reproducing compressed multi-valued image information.

It is a further object of the present invention to provide an image processing method and apparatus capable of reliably expanding and restoring multi-valued image information compressed by an ADCT method.

To achieve the above objects, according to a preferred embodiment of the present invention, an image processing method is disclosed in which image data compressed by an ADCT method and transmitted to a receiving station is expanded, and the expanded image data is processed using parameters sent from the transmitting station to reproduce an original image.

It is another object of the present invention to provide an image processing method capable of preventing an image quality from being deteriorated, by using a neural network.

It is a further object of the present invention to provide a facsimile apparatus capable of preventing an image quality from deteriorating.

The other objects and advantages of the present invention will become apparent from the following detailed description of the preferred embodiments when read in connection with the accompanying drawings.

BRIEF DESCRIPTION OF THE DRAWINGS

FIG. 2 is a block diagram showing the structure of a first embodiment of the present invention.

FIG. 7 is a block diagram showing the structure of a line buffer unit 112 shown in FIG. 6.

FIG. 8 is a block diagram showing the structure of a neural network 113 shown in FIG. 6.

FIG. 10 is a diagram showing an example of a table realizing the neural network 113 shown in FIG. 6.

DETAILED DESCRIPTION OF THE PREFERRED EMBODIMENTS

Prior to describing the embodiment methods, the outline of an ADCT method will be described with reference to FIG. 5, which is a block diagram showing the outline of an ADCT method.

Figure 5:
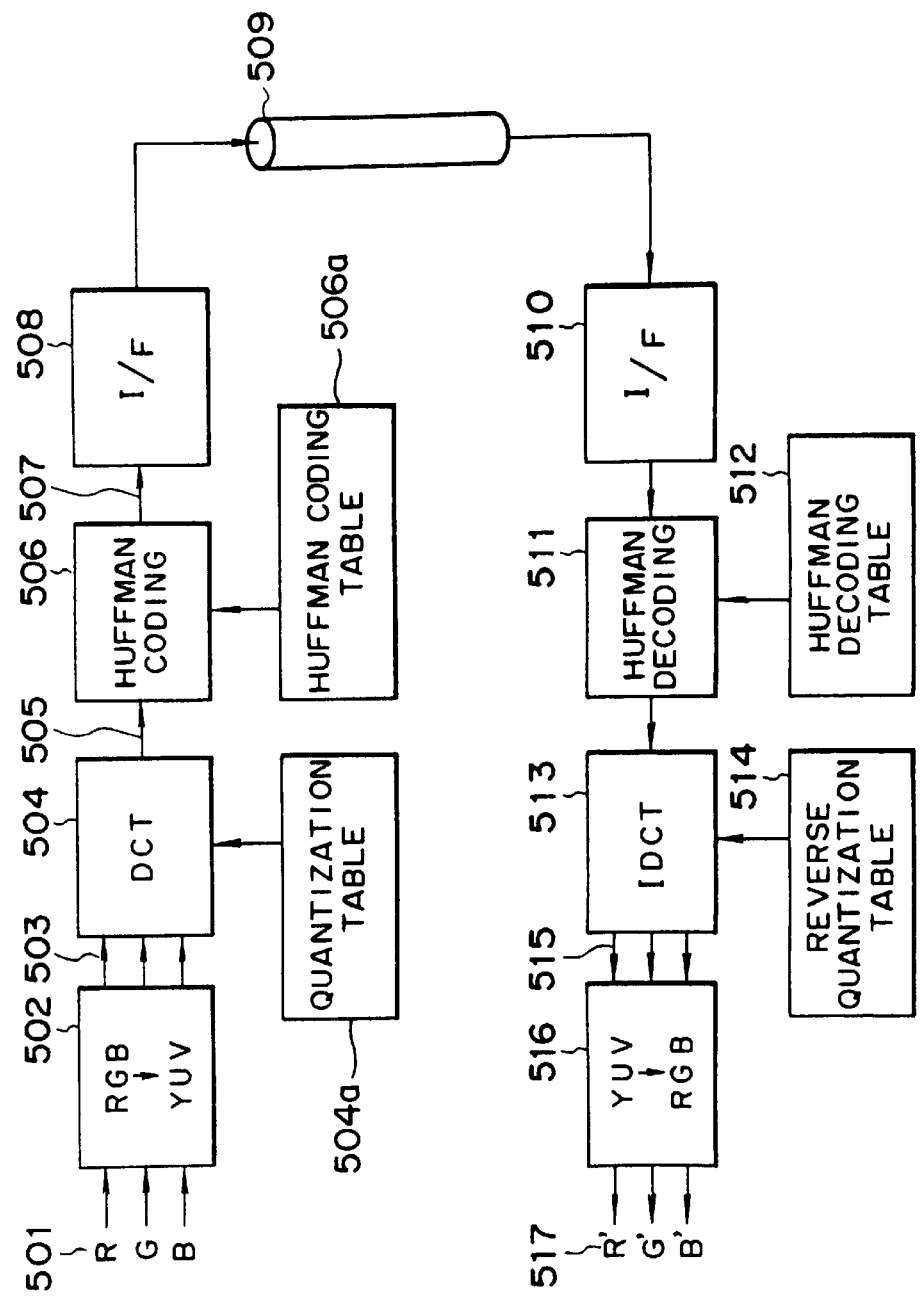
FIG. 5 is a block diagram showing the configuration of an ADCT method.

In FIG. 5, reference numeral 501 represents input color image data of separated three color signals. A block 502 transforms RGB three color signals into luminance, saturation, and hue components. Use of human visual sense can be made easy by this block. For example, luminance information up to high frequency components is required, so images are read finely, whereas hue information up to high frequency components is not required, so images are read coarsely. A DCT (Discrete Cosine Transformation) block 504 performs orthogonal transformation of respective components to analyze the frequencies from d.c. components to high frequency components. If the image quality is important, it is necessary to transmit image data up to high frequency components. If the transmission efficiency is to be improved with some sacrifice on image quality, it is necessary to finely quantize high frequency components or cut off small data. A quantization table 504a determines how efficiently the high frequency components are to be transmitted. Each frequency component is weighted using the quantization table. Each weighted frequency component of two-dimensional data is scanned in a zigzag manner from the d.c. component to the high frequency component to convert it into a one-dimensional data train which is then input to a Huffman coding unit 506 via a line 505. The Huffman coding unit encodes the DCT frequency component data and assigns a code in accordance with a predetermined rule (from a Huggman coding table 505A). The code assignment is broadly divided into assignment for d.c. components and assignment for a.c. components. In the assignment for d.c. components, a difference from the preceding line is calculated, and classified into one of several categories. When the category is determined, a pair of data, namely a category identifier code and difference data, is transmitted. In the assignment for a.c. components, the number of 0's following a non-zero value is calculated for the frequency components quantized by the quantization table, and classified into one of several categories. After this category classification, a pair of data, namely a category classification code and the number of following 0's, is encoded. An EOB (End of Block) signal is entered at the end of each line or when it is found that 0's will continue to the end of a line. In this manner, users can optimize category classification codes by calculating the occurrence frequency of similar original images. According to an ADCT method, a category clarification code table at the transmitting station is sent to the receiving station. The code data is input to an I/F 508 via a line 507 and transmitted over a transmission line 509. At the receiving station, a Huffman decoding table 512 and the reverse quantization table are made through the I/F 510 to prepare a decoding operation. The Huffman decoding unit 511 reproduces d.c. and a.c. component signals from the received, compressed data by using a Huffman decoding table 512. A block IDCT 513 obtains original frequency components from the weighted frequency components by using the reverse quantization table 514, and performs a discrete cosine inversion to reproduce signals similar to YUV signals of the original image. A block 516 reversely transforms YUV signals into RGB signals to obtain reproduced image signals 517.

As seen from the foregoing description, the main factors of deterioration of the image quality obtained at the receiving station are:

(1) the method of sampling color signal components at the block 502, and (2) a weighting and rounding error at DCT by the block 504.

The Huffman coding and decoding units 506 and 511 perform reversible coding and decoding so that it can be considered that they do not deteriorate the image quality.

Factor (1) degrades a resolution of color components. For example, blur will be produced on a reproduced image of yellow characters on the like.

Factor (2) degrades the frequency components of a reproduced image because the image data is divided and the integer part only is transmitted while discarding the fraction part, by using the quantization table. At the receiving station, the original frequency components are obtained from the weighted frequency components by using the reverse quantization table 514. However, as described above, the part of the image data rounded and cut off cannot be restored, resulting in deterioration of the image quality. With the present ADCT method, deterioration of the image quality by the factors (1) and (2) cannot be compensated for.

On the contrary, according to the embodiments of the present invention to be described later in detail, the transmitted image is judged at the receiving station by using the transmitted quantization table, whether it is an image containing high precision components of characters and graphics or an image not containing high precision components, and how much it contains high precision components.

Apart from the above, if the contents of the quantization table are known in advance, deterioration of an original image can be checked from an output image. Therefore, it is possible to obtain proper conversion coefficients through learning of a deteriorated image and an original image, by using a back-propagation scheme of a neural network, for example.

In the embodiments of the present invention to follow, the deterioration degree resulting from the ADCT processing is estimated by using the quantization table, and the image quality is improved by an image reproduction scheme such as a back-propagation scheme of a neural network.

Figure 1:
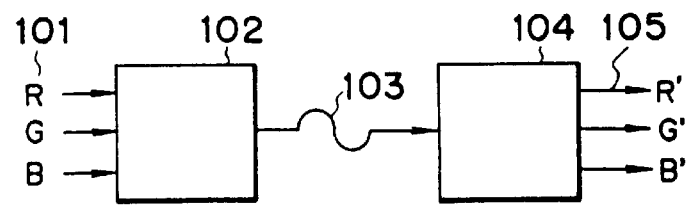
FIG. 1 is a block diagram showing the structure of a conventional image processing method.

FIG. 1 is a block diagram illustrating color image transmission using a conventional ADCT method. Reference numeral 101 represents separated multi-valued three color data output from a color scanner for example. A block 102 is an ADCT unit which may be an LSI chip CL550A/B announced by KUBOTASHI CUBE Co., Ltd. This chip may be used also at the receiving station. Image data compressed by the ADCT method is transmitted to a line 103. At the receiving station, the ADCT unit 104 using the same chip as the block 102 expands the received image data and obtains reproduced data 105. This circuit is associated with the above-described problem.

FIG. 2 is a block diagram showing the outline of an embodiment of the present invention. Reference numeral 201 represents separated multi-valued three color signals obtained by a color scanner for example, similar to the signals 101 shown in FIG. 1. A block 202 uses an ADCT chip the same as the block 102 shown in FIG. 1. The image data compressed by an ADCT method is transmitted to a line 203 similar to the line 103 shown in FIG. 1. A block 204 uses the same ADCT chip as the block 104 shown in FIG. 1. The separated three color signals obtained at 205 has undergone image quality deterioration, similar to the signals at 105 shown in FIG. 1. However, in this embodiment, blocks 206 to 208 are added to improve the image quality once deteriorated.

The block 206 receives a quantization table like that described with the block 504 shown in FIG. 5. In accordance with the received table, the block 206 makes a table to be used at the reverse DCT transformation, and judges how much the original image contains a high precision area.

By analyzing the transmitted quantization table, it is possible to estimate the type of the transmitted image to some degree and to estimate the factors of deterioration of the image quality by the ADCT method.

The number of quantization tables is not infinite, but can be limited to several tables. The contents of a transmitted quantization table reflect the contents of the original image.

For example, if the quantization table is formed such that it provides a smaller quantization step to d.c. components and a larger quantization step to high frequency components, the d.c. components can be reproduced reliably. However, the image quality at the high frequency components is deteriorated, with possibly some blur at the high precision area of characters and graphics and different colors from the original image caused by a difference in degree of deterioration between colors.

The block 207 is a selection unit for selecting from the block 206 optimum parameters to be used for reproducing the original image, in accordance with the deterioration factors of the ADCT method detected at the block 206. The block 208 is a reproduction unit for reproducing the original image by using the optimum parameters selected by the selection unit 207.

The obtained separated three color signals 209 can reproduce an image of high quality near the original image, by compensating the image deterioration caused by the ADCT method.

Figure 3:
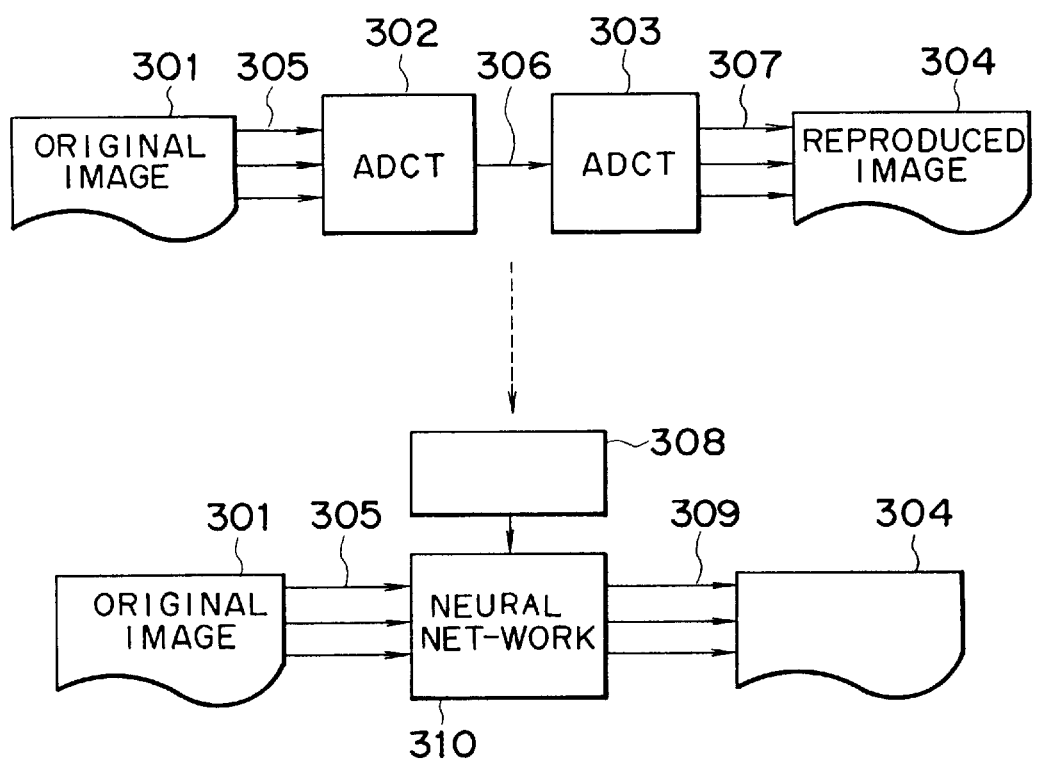
FIG. 3 is a diagram explaining the operation of a reproduction unit 208 shown in FIG. 2.

FIG. 3 is a block diagram explaining how the reproduction unit 208 is realized. Reference numeral 301 represents an original image which is read with a color scanner or the like. The image data is then compressed by an ADCT chip 302 and transmitted via a line 307 to an ADCT chip 303 to be expanded. The expanded data 307 is output to a color printer to obtain a reproduced image of 304. It is conceivable that the reproduced image 304 can be used to obtain the original image by using the parameters of the ADCTs 302 and 303.

In realizing reproduction unit 310, a neural network 310 using a neural back-propagation scheme shown in FIG. 3 also can be structured in which reference numeral 301 represents teach signals and reference numeral 304 represents input signals. A block 308 stores the parameters to be used by the quantization table.

Figure 4:
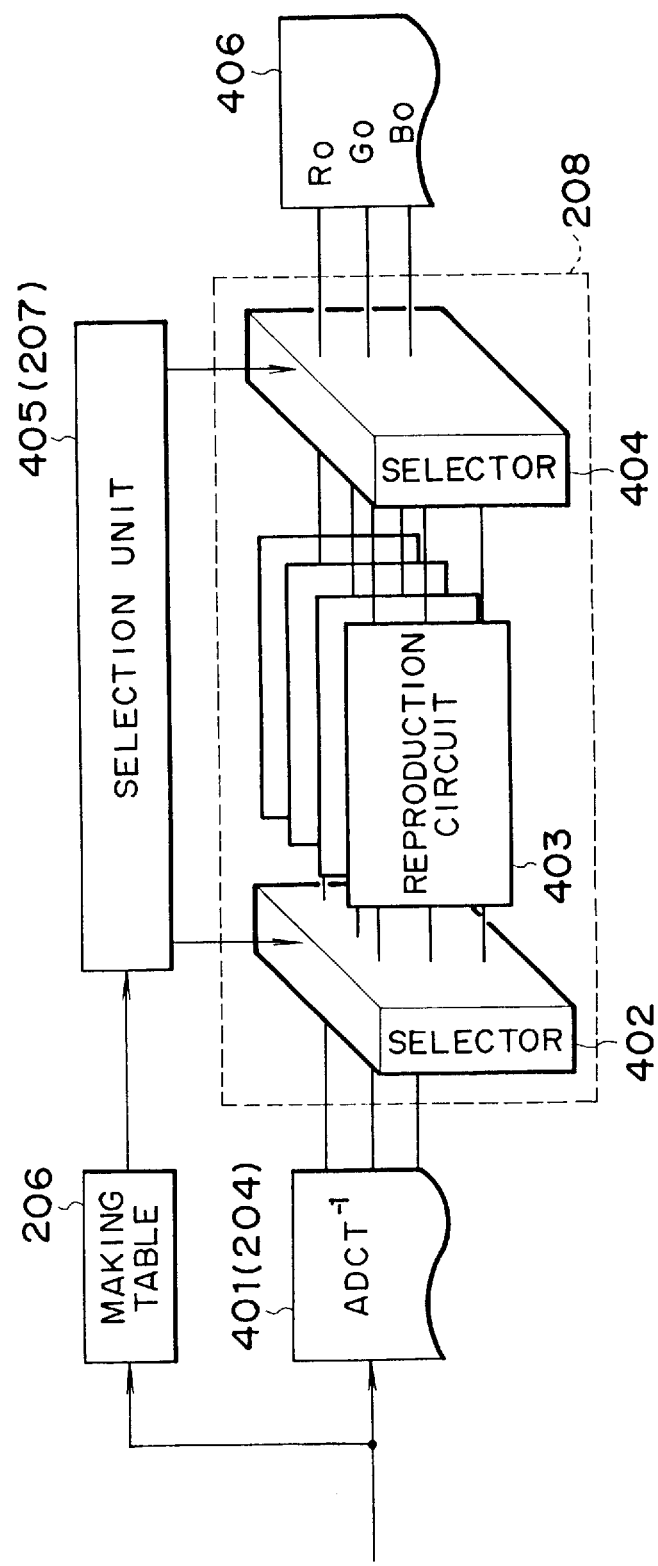
FIG. 4 is a block diagram showing the structure of the reproduction unit 208 shown in FIG. 2.

A method of reproducing an original image using a neural network will be described later in particular. FIG. 4 shows an example of the structure of the reproduction unit 208 shown in FIG. 2. A block 401 corresponds to the block 204 shown in FIG. 2, and reference numeral 406 corresponds to the reference numeral 209 shown in FIG. 2. In FIG. 2, the quantization table data transmitted from the transmission line 203 is input to the block 206. The selection unit 207 checks the contents of the formed quantization table and classifies the transmitted image data (e.g., into several categories such as image data mainly containing half-tone image data, image data containing high precision image data of characters and graphics). The selection unit 207 corresponds to the selection unit 405 shown in FIG. 4.

In this manner, the characteristics of the transmitted image data can be discriminated and an optimum reproduction circuit can be selected. Specifically, selectors 402 and 403 are switched in response to signals supplied from the selection unit 405 to select one of a plurality of reproducing circuits 403. Each reproducing circuit 403 is set with a coupling coefficient table determined through learning of quantization tables by the neural network, to optimize the reproduction circuit.

Next, another embodiment of the present invention will be described.

Figure 6:
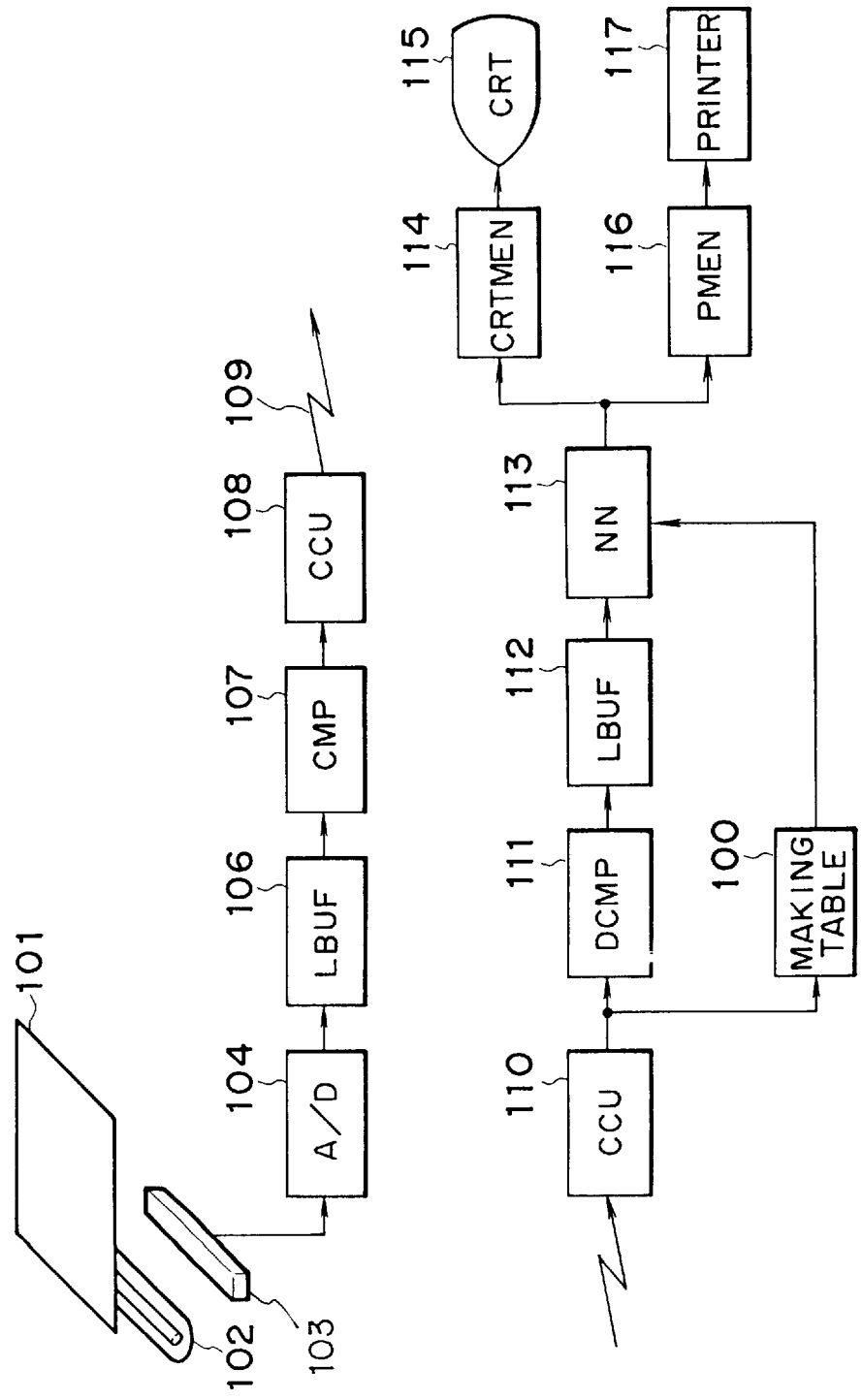
FIG. 6 is a block diagram showing the structure of a second embodiment of the present invention.

FIG. 6 is a block diagram showing an embodiment of a color facsimile apparatus. In FIG. 6, a color image is recorded on an original 101. A light source 102 illuminates the original 101. Reference numeral 103 represents a CCD for photoelectrical conversion. and reference numeral 104 represents an A/D converter for converting an analog signal from CCD 103 into a digital signal. The A/D converter is generally of an 8-bit type for conversion into multi-valued data. CCD 103 has stripe filters to output three separated color signals. Three A/D converters are provided for converting three analog signals into digital signals.

For the simplicity of description, only one color component will be described.

A/D converted original image data is input to a line buffer memory 106 having a capacity of several lines, and compressed by an ADCT compression circuit CMP 107. The compressed data is transmitted to a receiving station via digital circuit communication unit CCU 108 or analog circuit modem. Reference numeral 109 represents an ISDN or public telephone line. A CCU 110 has the same structure as CCU 108 and is used as a demodulator. A decompressor circuit (DCMP) 111 expands the received compressed data and writes it in a line buffer memory 112.

Reference numeral 100 shown in FIG. 6 represents a table making unit for making from the received data a quantization table to be used at the receiving station. DCMP 111 expands data in accordance with the data received from the table making unit 100. A neural network NN 113 controls its neurons by using the data from the table making unit 100.

The neural network NN 113 restores the multi-valued original image data from ADCT original expansion image data loaded in a line buffer 112. Interconnection between the line buffer 112 and network 113 is shown in FIG. 7, and the structure of the network 113 is shown in FIG. 8. A plurality of network 113 are provided and one of them is selectively used.

Figure 9A:
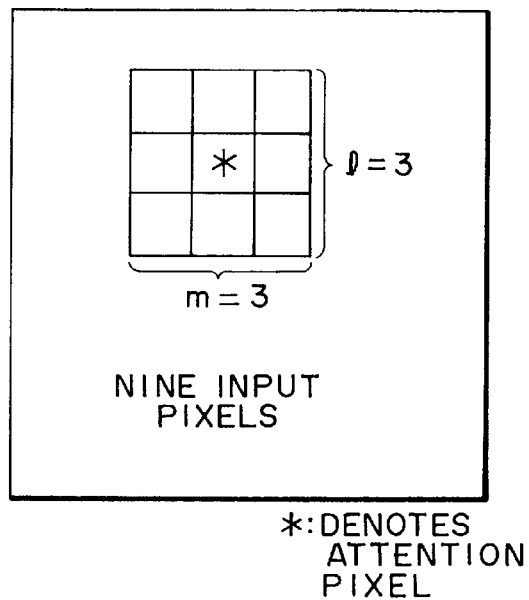
FIGS. 9A and 9B are diagrams explaining the operation of the neural network 113 shown in FIG. 6.

In FIG. 7, the line buffer 112 is structured as a three-line buffer 201. This three-line buffer 201 stores data of three lines consecutive in the vertical direction of an image. Data from the leftmost to rightmost in the same horizontal line of each of three lines is sequentially output, synchronously with clocks, to a latch group 202 having a plurality of delay elements. Data in a small area of 3×3 in the horizontal and vertical directions shown in FIG. 9A is latched in the latch group 202. The latch group 202 has nine latches, an output of each latch being input to the neural network NN 113. In the conversion of ADCT original expansion image data into multi-valued original image data by NN 113, image data for the central pixel (shown in FIG. 9B) of the small area is obtained from nine pixel data shown in FIG. 9A. As multi-valued image data, 8-bit (256 tones) image data is used in this embodiment.

Figure 9B:
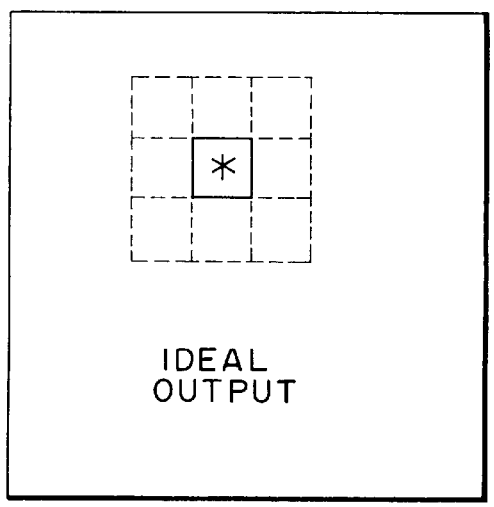

As described with respect to FIGS. 9A and 9B, the embodiment apparatus shown in FIG. 6 uses a 3×3 small area or reference area for restoring multi-valued original image data from the ADCT original expansion image data.

As shown in FIG. 6, the multi-valued image data from NN 113 is supplied to a memory 114 for CRT 115 capable of displaying multi-valued image data, and to another memory 116 for a printer 117 capable of printing multi-valued image data. The image data in the memories 114 and 115 is displayed or printed by CRT 115 or printer 117 to obtain a multi-valued image.

The details of a neural network are described, for example, in "Using Neural Network for Pattern Recognition, Signal Processing, and Knowledge Processing", Nikkei Electronics, Aug. 10, 1987. A neural network will be explained below.

FIG. 8 is a block diagram showing an example of the structure of the neural network NN 113. This neural network can process a reference block having a dimension of n=m×l. In the example shown in FIG. 9, m=3, l=3, and n=9. In FIG. 8, reference numeral 301 represents an input hierarchy layer i, reference numeral 302 represents a middle hierarchy layer j, and reference numeral 303 represents an output hierarchy layer k. In order to use the reference block having the dimension of 3×3 shown in FIG. 9A, nine neurons are required at the input hierarchy layer i. The number of neurons at the middle hierarchy layer j is determined in accordance with the desired precision of an image to be reproduced. In this embodiment, the number of neurons at the middle hierarchy layer j is set to nine. A single neuron is necessary for the output hierarchy layer k. The coupling intensity between the input hierarchy layer i and middle hierarchy layer j is represented by $W_{ji}$, and that between the middle hierarchy layer j and output hierarchy layer k is represented by $W_{kj}$.

The coupling intensities $W_{ji}$ and $W_{kj}$ are determined through learning. The reproduction precision of the neural network depends on these coupling intensities. Each neuron is constructed of a plurality of adders, multipliers, and dividers (not shown). If the coupling intensities $W_{ji}$ and $W_{kj}$ determined through learning are considered sufficient and no more learning is necessary, then the system configuration of the neural network is finally determined. Each neuron in this embodiment is constructed as shown in FIG. 10.

In FIG. 10, $T_1$ to $T_n$ indicated at $400_1$ to $400_n$ are look-up tables used for multiplying input data by a coupling coefficient ($W_{ji}$ or $W_{kj}$). The values in the table are determined through learning as will be described later. An input to the table is an output from a preceding stage neuron. Adders $401_1$ to $401_n$ each add two inputs. A look-up table $T_{net}$ 404 normalizes the total addition result of the adders $401_1$ to $401_n$, by using a sigmoid function. With each neuron being constructed as shown in FIG. 10 and the whole network being constructed as shown in FIG. 8, the hardware structure can be simplified and the processing speed becomes sufficient for practical use.

Next, the procedure of learning table data will be briefly described with reference to FIG. 8. Prepared first as learning data are the multi-valued original image data and the ADCT original expansion image data. The ADCT original expansion image data is obtained by compressing the multi-valued original image data using the same parameters of the ADCT at the transmitting station, and by expanding it at the receiving station. The multi-valued original image data is used as an ideal output for the ADCT original expansion data, thereby to generate a teach signal. A plurality of teach signals may be used. Proper initial coupling coefficients $W_{ji}$ and $W_{kj}$ are determined. Using these initial coefficients, the ADCT original expansion image data is input as the learning data to obtain an output of multi-valued image data (kout). This output is compared with the multi-valued original image data as the ideal output to generate a teach signal. This procedure is indicated in FIG. 8 by arrows $\hat{1}$ to $\hat{2}$. In accordance with this teach signal, the coupling coefficients $W_{ji}$ and $W_{kj}$ are corrected by means of a back-propagation scheme. This procedure is indicated in FIG. 8 by arrows $\hat{3}$ to $\hat{4}$. Such learning is repeated to correct the coupling coefficients $W_{ji}$ and $W_{kj}$ until they become sufficient for the conversion of ADCT original expansion image data into estimated multi-valued original image data. The resultant coupling coefficients $W_{ji}$ and $W_{kj}$ are stored in the tables $T_l$ to $T_n$ indicated at $401_l$ to $400_n$.

Figure 11:
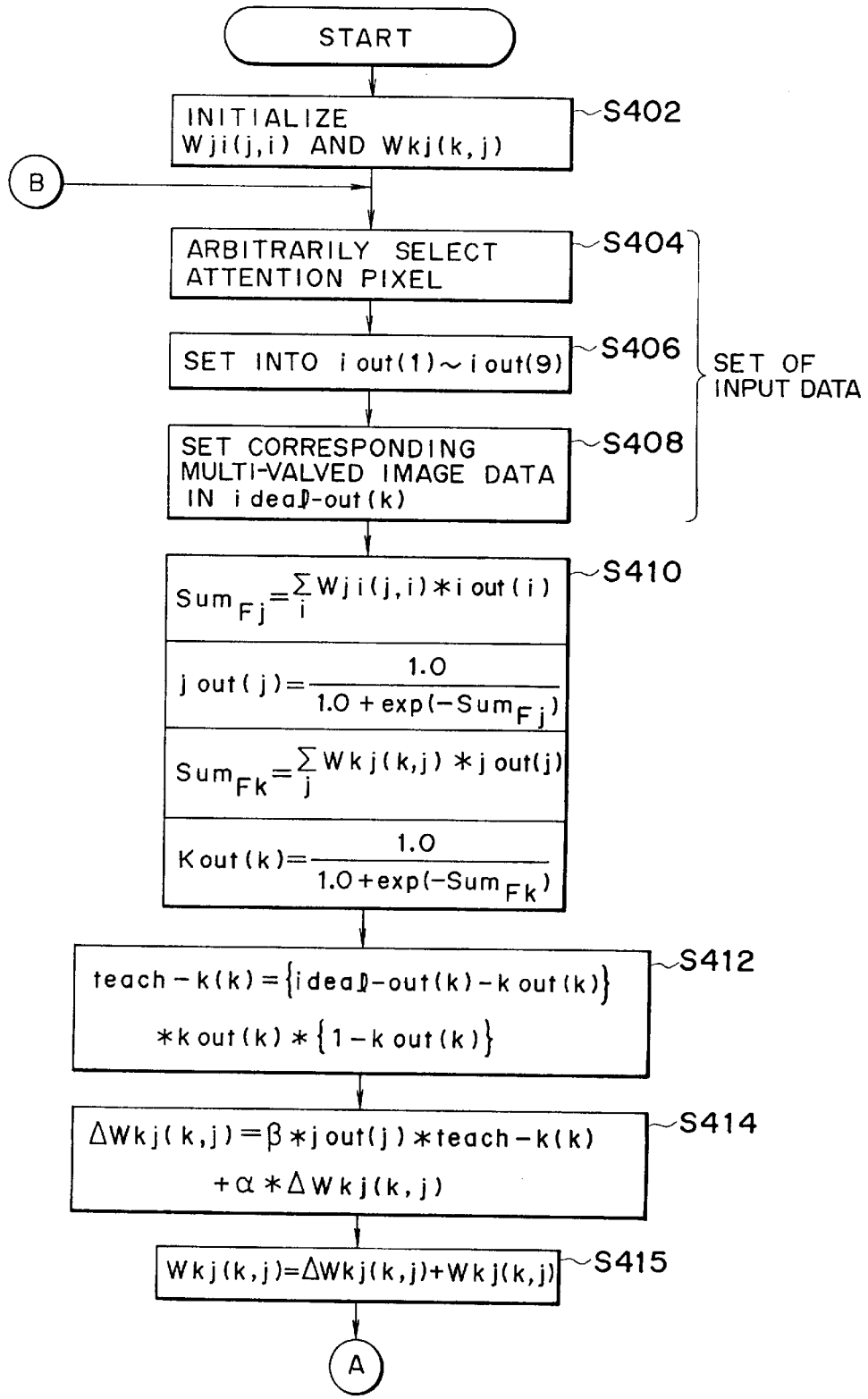
FIG. 11 is a flow chart showing the procedure of determining the operating characteristics of the reproduction unit shown in FIG. 6.
Figure 12:
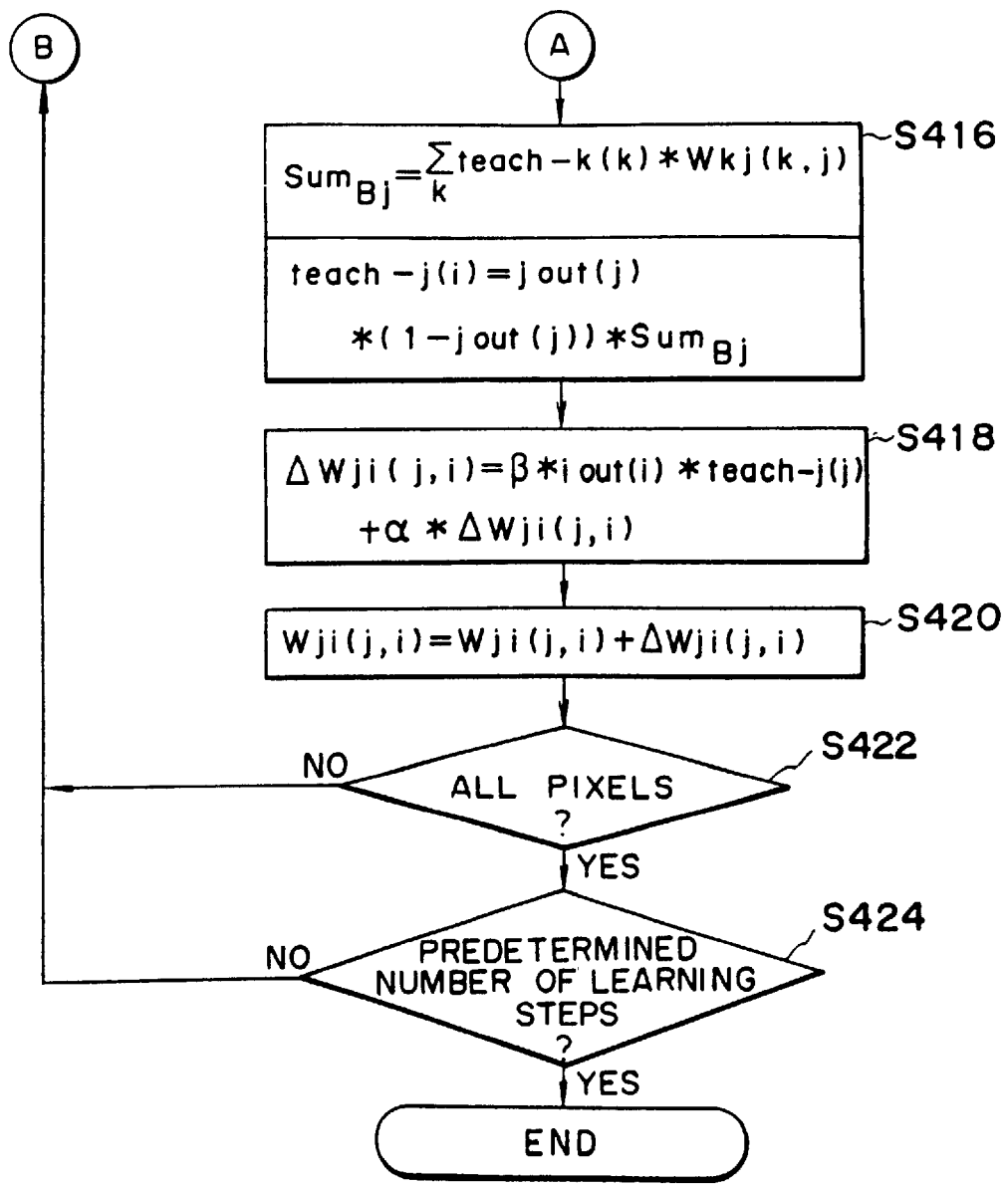
FIG. 12 is a flow chart (which is a continuation of that in FIG. 11) showing the procedure of determining the operating characteristics of the reproduction unit shown in FIG. 6.

The procedure of learning will be described in more detail with reference to the flow charts shown in FIGS. 11 and 12. At step S402, initial values are determined for the weighting coefficient $W_{ji}$ representative of the coupling intensity between the input hierarchy layer and middle hierarchy layer and for the weighting coefficient $W_{kj}$ representative of the coupling intensity between the middle hierarchy layer and output hierarchy layer. The initial value are selected from within the range of −0.5 to +0.5 considering the convergence of learning. At step S404, a pixel at an arbitrary position is selected as an attention pixel (at the position indicated by * in FIG. 9A) from the input learning data. Steps S406 to S408 indicate the procedure of setting input/output data to the neural network. Specifically, at step S406, the image data iout (i) (i=1 to 9) within the 3×3 area around the attention pixel is set to the input hierarchy layer. At step S408, a multi-valued image data (ideal-out) as an ideal output for the attention pixel is provided. Step S410 indicates the procedure of calculating an output kout (k) by using the given conversion coefficients.

Specifically, the i-th data iout (i) from the input hierarchy layer is multiplied by the middle hierarchy layer coefficient $W_{ji}$. The total sum $Sum_{Fj}$ for all i's is calculated:

$$Sum_{Fj} = \Sigma_i W_{ji}(j, i) * iout(i) \quad (1)$$

Next, using the sigmoid function, the j-th output jout (j) of the middle hierarchy layer is obtained in the 0/1 normalized form by using the following equation:

$$jout(j) = 1.0/1.0 + exp(-Sum_{Fj}) \quad (2)$$

F of $Sum_{Fj}$ represents a capital of a word Forward. Similarly, the output value kout from the middle hierarchy layer to the output hierarchy layer is obtained in the following manner. First, similar to the equation (1), the sum $Sum_{Fk}$ of multiplication of the output hierarchy layer coefficient $W_{kj}$ by the output value jout (j) from the middle hierarchy layer is obtained by:

$$Sum_{Fk} = \Sigma_j W_{kj}(k, j) * jout(j) \quad (3)$$

Next, by using the sigmoid function to normalize in the 0/1 form, the output kout (k) at the output hierarchy layer k is obtained by:

$$kout(k) = 1.0/1.0 + exp(-Sum_{Fk}) \quad (4)$$

In this manner, calculation in the forward direction is performed for a set of sample data. The following description is for the procedure of calculation in the backward direction, i.e., the procedure of correcting coupling intensities in accordance with values learnt from a set of sample data including the input and ideal output.

At step S412, the output values kout calculated by the equations (1) to (4) using the initial values $W_{ji}$ and $W_{kj}$ set at the step S402 are compared with the prepared ideal outputs ideal out (k). With this comparison, the teach signals teach k (k) are calculated by:

$$teach\ k\ (k) = \{ideal\ out\ (k) - kout\ (k)\} * kout\ (k) * \{1 - kout\ (k)\} \quad (5)$$

The kout (k)*{1−kout (k)} in the equation (5) means a differential value of the sigmoid function. Next, at step S414, a change width $\Delta W_{kj}(k, j)$ of the coupling coefficient at the output hierarchy layer is obtained by:

$$\Delta W_{kj}(k, j) = \beta * jout(j) * teach\ k\ (k) + \alpha * \Delta W_{kj}(k, j) \quad (6)$$

$\alpha$ and $\beta$ are fixed value coefficients. In this embodiment, they are set to 0.5. At step S415, using the change width $\Delta W_{kj}(k, j)$, the coupling coefficient $W_{kj}(k, j)$ between the middle and output hierarchy layers is renewed, i.e., learnt:

$$W_{kj}(k, j) = \Delta W_{kj}(k, j) + W_{kj}(k, j) \quad (7)$$

Next, at step S416 the teach signals teach j (j) at the middle hierarchy layer are calculated. Namely, first the contribution of the output hierarchy layer in the backward direction to the neurons at the middle hierarchy layer is calculated by:

$$Sum_{Bj} = \Sigma_k teach\ k\ (k) * W_{kj}(k, j) \quad (8)$$

Then, this contribution is normalized by using the differential value of the sigmoid function to calculate the teach signals teach j (j) by:

$$teach\ j\ (j) = jout(j) * \{1 - jout(j)\} * Sum_{Bj} \quad (9)$$

The term teach j (j) in the equation (9) means an ideal signal at the middle hierarchy layer.

Next, at step S418, using the teach signals teach j (j), a change width $\Delta W_{ji}(j, i)$ of the coupling coefficient at the middle hierarchy layer is calculated by:

$$\Delta W_{ji}(j, i) = \beta * iout(i) * teach\ j\ (j) + \alpha * \Delta W_{ji}(j, i) \quad (10)$$

At step S420, the coupling coefficient $W_{ji}(j, i)$ is renewed as:

$$W_{ji}(j, i) = W_{ji}(j, i) + \Delta W_{ji}(j, i) \quad (11)$$

As described above, the coupling coefficients $W_{ji}$ and $W_{kj}$ are learnt by using an ideal output ideal out of a multi-valued image data for an attention pixel and a reproduced multi-valued image data, the latter being obtained from the ADCT original expansion image data for the attention pixel and for the peripheral nine pixels. At step S422, it is checked whether the above procedure has been carried out for all attention pixels (all combinations of sampling data). If not, the steps S404 to S420 are repeated until all combinations of sampling data have been completed.

Learning for all combination of sampling data only once will probably result in poor precision. Therefore, the steps S404 to S422 are repeated until step S424 judges that good precision has been obtained.

The attention pixel designated at step S404 is preferably designated at random and not sequentially.

In this manner, the coupling constants of the neural network shown in FIG. 8 are optimized so as to be suitable for the conversion of ADCT original expansion image data into estimated multi-valued original image data. The coupling constants are then stored in the tables $T_l$ to $T_n$.

The tables are made for various representative images, such as images containing many character areas, images containing less character areas, and images containing many color areas.

As appreciated from the embodiment apparatus, both character areas and half-tone areas of images are learnt within a certain ADCT original expansion image area. Therefore, an estimated multi-valued image has no blur in the character area and has a smooth half-tone area.

The method of the present invention is not adaptive processing of finite steps, but adaptive processing of infinite learning steps (although finite in practice, it has a great number of steps) by using a neural network. Therefore, erroneous judgment rarely occurs.

Various modifications and changes of the above embodiments are possible: for example, although 3×3 pixel inputs and one pixel output have been used in the above embodiments, the number of input/output pixels, such as 5×7 input pixels and 3×3 output pixels, may be set as desired following the method described above.

The above embodiments are intended to reproduce an image of improved quality at a receiving station while keeping the framework of present standardization works. Particularly with the ADCT method, a transmitting station is required to transmit coded quantization table and Huffman coding table to a receiving station. Therefore, the coding parameters of the received coded data can be estimated. According to the embodiments, it is possible to improve the image quality of characters and graphics and reproduce an original image, while using a high compression ratio and keeping the present ADCT standards.

In the above embodiment methods, a neural network has been used for estimating an original image from ADCT original expansion image data. The present invention is applicable also to various conventional image reproducing methods such as an estimating method using Karman's filters and an estimating method using maximum estimation.

Furthermore, the ADCT method has been used as a compression method in the above embodiments. The present invention is not limited only to it, but various compression methods may be used such as modified ADCT methods, and a method whereby given image data is subject to orthogonal transformation, color quantization matching predetermined characteristics, and then vector quantization, so long as these methods reproduce an original image by using data representing quantization characteristics or Huffman coding table.

As described so far, according to the present embodiments, it is possible to prevent deterioration of the image quality of characters, graphics and the like.

What is claimed is:

1. An image processing method comprising the steps of:
   inputting coded image data and a coding parameter for use in processing the coded image data, wherein the coding parameter includes a quantizing parameter and is transmitted together with the coded image data;
   decoding the coded image data to produce decoded image data in accordance with the coding parameter;
   estimating a deterioration factor based on the coding parameter;
   selecting a suitable correction parameter in accordance with the deterioration factor; and
   correcting the decoded image data in accordance with the correction parameter.

2. A method according to claim 1, wherein the coded image data is data coded by an irreversible compression method.

3. A method according to claim 2, wherein the irreversible compression method quantizes image data.

4. A method according to claim 1, wherein, in said correcting step, the decoded image data is corrected by using a neural network.

5. A method according to claim 1, wherein the image data is color image data.

6. A method according to claim 1, wherein the coded image data is data coded by means of a DCT method.

7. An image processing method comprising the steps of:
   discriminating at a receiving station characteristics of coded image data transmitted from a transmitting station, including a deterioration factor of the coded image data, in accordance with a quantization table representing quantization characteristics or a Huffman coding table transmitted from the transmitting station, wherein the quantization table is transmitted together with the coded image data; and
   determining an image correcting method to be used after the coded image data is decoded at the receiving station, in accordance with the discriminated characteristics,
   wherein the image correcting method selects suitable correction parameters to correct the decoded image data.

8. A method according to claim 3, wherein the parameter is a parameter used in the quantization.

9. An image processing apparatus comprising:
   inputting means for inputting coded image data and a coding parameter for use in processing the coded image data, wherein the coding parameter includes a quantizing parameter and is transmitted together with the coded image data;
   decoding means for decoding the coded image data to produce decoded image data in accordance with the coding parameter;
   estimating means for estimating a deterioration factor based on the coding parameter;
   selecting means for selecting a suitable correction parameter in accordance with the deterioration factor; and
   correcting means for correcting the decoded image data in accordance with the correction parameter.

10. A method according to claim 7, wherein the coded image data is data coded in accordance with the quantization table or the Huffman coding table.

11. A method according to claim 7, further comprising the step of performing image correction using a neural network.

12. A method according to claim 7, wherein the image data is color image data.

13. An apparatus according to claim 9, wherein the coded image data is coded according to a predetermined Huffman table.

14. A method according to claim 7, wherein the coded image data is data coded by means of a DCT method.

15. An apparatus according to claim 13, wherein the coding parameter is the Huffman table.

16. A method according to claim 9, wherein the coded image data is data coded by an irreversible compression method.

17. An apparatus according to claim 9, further comprising means for reproducing the image data corrected by said correcting means, as a visual image.

18. An apparatus according to claim 17, wherein said reproducing means comprises a printer.

19. An apparatus according to claim 9, wherein said correcting means operates by using a neural network.

20. An apparatus according to claim 9, wherein the image data is color image data.

21. A method according to claim 9, wherein the coded image data is data coded by means of a DCT method.

22. An apparatus according to claim 9, wherein the coded image data is quantized according to a predetermined quantization table.

23. An apparatus according to claim 22, wherein the coding parameter is the quantization table.

* * * * *

UNITED STATES PATENT AND TRADEMARK OFFICE
CERTIFICATE OF CORRECTION

PATENT NO. : 5,841,904

DATED : November 24, 1998

INVENTOR(S) : SUSUMU SUGIURA                                    Page 1 of 2

It is certified that error appears in the above-identified patent and that said Letters Patent is hereby corrected as shown below:

COLUMN 1

Line 14, "adoptive" should read --adaptive--;

COLUMN 2

Line 58, "Huggman" should read --Huffman--;

COLUMN 3

Line 8, "clarification" should read --classification--;

COLUMN 4

Line 19, "has" should read --have--;
  Line 54, "the image" should read --for the image--;

COLUMN 5

Line 64, "network" should read --networks--;

UNITED STATES PATENT AND TRADEMARK OFFICE
CERTIFICATE OF CORRECTION

PATENT NO.   : 5,841,904

DATED        : November 24, 1998

INVENTOR(S)  : SUSUMU SUGIURA

It is certified that error appears in the above-identified patent and that said Letters Patent is hereby corrected as shown below:

COLUMN 7

Line 20, "1̂ to 2̂." should read -- ①  to ②.--;
    Line 23, "3̂" should read --③--;
    Line 24, "4̂." should read --④.--;

COLUMN 9

Line 4, "combination" should read --combinations--.
    Line 28, "possible:" should read --possible--.

Signed and Sealed this

Eighth Day of February, 2000

Attest:

Q. TODD DICKINSON

Attesting Officer     *Commissioner of Patents and Trademarks*